US009024943B2

(12) United States Patent
Liu

(10) Patent No.: US 9,024,943 B2
(45) Date of Patent: May 5, 2015

(54) THREE-DIMENSIONAL STEREOSCOPIC IMAGING METHOD, SYSTEM AND IMAGING DEVICE

(75) Inventor: Wuqiang Liu, Shenzhen (CN)

(73) Assignee: Tiegang Yue, Shenzhen, Guangdong (CN)

( * ) Notice: Subject to any disclaimer, the term of this patent is extended or adjusted under 35 U.S.C. 154(b) by 217 days.

(21) Appl. No.: 13/508,732

(22) PCT Filed: Jul. 31, 2010

(86) PCT No.: PCT/CN2010/075611
§ 371 (c)(1),
(2), (4) Date: May 9, 2012

(87) PCT Pub. No.: WO2011/091660
PCT Pub. Date: Aug. 4, 2011

(65) Prior Publication Data
US 2012/0287125 A1 Nov. 15, 2012

(30) Foreign Application Priority Data
Feb. 1, 2010 (CN) .......................... 2009 1 0109909

(51) Int. Cl.
*G06T 15/00* (2011.01)
*H04N 13/04* (2006.01)
*G02B 27/22* (2006.01)

(52) U.S. Cl.
CPC ........ *H04N 13/0495* (2013.01); *G02B 27/2221* (2013.01); *G02B 27/2242* (2013.01)

(58) Field of Classification Search
CPC ... G06T 19/003; G06T 2219/028; G06T 5/50; G02B 6/3803; G02B 27/225; G02B 6/2555; G09F 9/3026; H04N 13/0495; H04N 13/0443; H04N 13/0436; H04N 13/0217; H04N 13/0402; G06K 2009/2045; G06K 9/32; G09G 2300/0434; G09G 3/3614
USPC ......................................................... 345/419
See application file for complete search history.

(56) References Cited

U.S. PATENT DOCUMENTS

| 6,525,699 | B1 * | 2/2003 | Suyama et al. | 345/6 |
| 2004/0056997 | A1 * | 3/2004 | Yoshii et al. | 349/113 |
| 2005/0104878 | A1 * | 5/2005 | Kaye et al. | 345/419 |
| 2006/0273983 | A1 * | 12/2006 | Koo et al. | 345/6 |

* cited by examiner

*Primary Examiner* — Kee M Tung
*Assistant Examiner* — Haixia Du

(57) ABSTRACT

A three-dimensional stereoscopic imaging method includes: longitudinally slicing a three-dimensional scene according to a physical depth of field to produce several two-dimensional layers; respectively displaying each two-dimensional layer on each different two-dimensional display window to form several two-dimensional pictures; polarizing light emitted from the two-dimensional display windows to transmit the light into human eyes, in such a manner that the human eyes are able to perceive the images of all the pictures, and splicing the images of all the two-dimensional pictures into an image of the original three-dimensional scene. The method realizes a three-dimensional stereoscopic imaging by simulating a real physical depth of field generated by human eyes perceiving a real three-dimensional stereoscopic image. Viewers are able to see a three-dimensional scene without wearing glasses. A three-dimensional stereoscopic imaging system and an imaging device thereof are further provided.

14 Claims, 7 Drawing Sheets

THREE-DIMENSIONAL STEREOSCOPIC IMAGING METHOD, SYSTEM AND IMAGING DEVICE

CROSS REFERENCE OF RELATED APPLICATION

This is a U.S. National Stage under 35 USC 371 of the International Application PCT/CN2010/075611, filed Jul. 31, 2010.

BACKGROUND OF THE PRESENT INVENTION

1. Field of Invention

The present invention relates to a three-dimensional (3D) stereoscopic imaging technology, and more particularly to a 3D stereoscopic imaging method having a real physical depth of field, a system thereof and an imaging device thereof.

2. Description of Related Arts

Different from the two-dimensional (2D) plan imaging technology, the 3D stereoscopic imaging technology compresses 3D image information into a 2D plan, which necessarily causes an image distortion and fails to accurately show a real spatial location of each pixel in the image. A 2D plan displays a 3D image through brightness of colors, sizes of objects and so on. Based on psychological cues and information including brightness of colors and sizes of objects, people subjectively judge distances between each pixel on the 2D plan and human eyes, rather than a real physical depth of field.

The 3D display, different from the 2D display, brings viewers visual depth perception through various ways in such a manner that the viewers naturally or unnaturally obtain information about a third dimension of a picture. This perceiving method defines a difference between a real 3D and a fake 3D for the human eyes. Thus, in the 3D stereoscopic imaging technology, it is very important to restore the real physical depth of field in a 3D stereoscopic space and also it is the most key factor for the human eyes to perceive a 3D stereoscopic image.

Physiology studies indicate that human eyes obtain the 3D stereoscopic perception of the objective world mainly through following four effects.

(1) Accommodation Effect

The accommodation effect means that the human eyes adjust focuses of the crystal bodies in the eyeballs through ciliary muscle contraction. Obviously, the accommodation effect still exists even in a monocular observation, which belongs to a psychological cue of monocular depth perception. However the psychological cue of the monocular depth perception works only under cooperation with a binocular psychological cue and when the observed object is relatively close to the human eyes.

(2) Convergence Effect

The convergence effect refers that when two eyes are observing a point of an object, visual axes of the two eyes form a convergence angle. Obviously, the ciliary muscle contracts to turn the eyeball inward slightly so that a psychological cue of depth perception is generated when two eyes are focused on the point. The binocular psychological cue is called convergence effect. Usually the accommodation effect and the convergence effect are related with each other. The convergence effect becomes obvious only when the observed object is close to the human eyes.

(3) Binocular Disparity

Two human eyes are spatially separated by an interpupillary distance around 6.5 cm. When the two eyes are observing a 3D stereoscopic object, the two eyes stand from slightly different angles and thus views from the two eyes are slightly different, which is called the binocular disparity. For objects provided at a medium sight distance, the binocular disparity information is acknowledged by people as the most important psychological cue in the depth perception. When two eyes are observing a point of an object, the point in space projects to the centers of the retinas of the two eyes. Thus, the two centers of the pair of eyes generate "corresponding positions" on the retinas and further a convergence angle is decided by the "corresponding positions". Light projected from many other points except the view point does not always fall on the two retinal "corresponding positions". This is defined as the binocular disparity. This basic principle is applied in various modern technologies which generates 3D stereoscopic images through 2D plan images.

(4) Monocular Motion Parallax

When an object is observed only with one eye, if the eye keeps stationary, the accommodation effect is the only psychological cue to obtain depth perception; if the observer moves, the object is observed from all directions based on the binocular parallax to provide cues for the depth perception, which is called the monocular motion parallax. Obviously, the monocular motion parallax does not work for static objects.

The human eyes watches a reconstructed image of holography just like watching a real 3D object, wherein all the above four effects exist. Thus the human eyes are watching naturally.

Nowadays, the "3D stereoscopic display technology" includes the glasses-wearing stereo technology and the glasses-free stereo technology. When people are watching a 3D movie (the common glasses-wearing 3D movie), only the binocular parallax exists. Even though the binocular parallax is a very key psychological cue to obtain depth perception according to physiology, an absence of other psychological cues results in a nervous state of human eyes rather than a very natural state. The nervous state remains unobvious in a short period of watching static stereoscopic image, but when watching a stereoscopic television set, the unnaturally watching state of the human eyes lasts in such a long time that people may feel very uncomfortable and very fatigued. Thus a pair of red-blue glasses or a pair of light-polarizing glasses produces a type of "eyes-deceived fake stereoscopic effects" and fails to well restore real spatial perception.

The glasses-free stereoscopic display technology includes a holographic 3D display technology, a volumetric 3D display technology and so on.

Under a principle that a specular reflection produces a mirror image, the holographic 3D technology produces very lifelike stereoscopic effects. However, a dynamic display requires a very high spatial light modulator and a super-high-speed data processing system, which limit developments and applications into daily life of the holographic 3D technology. In the patent US2008/0144175 A1, VIZOO Invest ApS discloses a pyramid-like 360 degrees display device. Based on the principle that reflection produces a mirror image, the device uses four reflective mirrors to image a plan image above or below the reflective mirror at a center of the pyramid-like structure to realize the 360 degrees displaying angle. A simple device like this still projects plan images, but provides viewers with cues of "a virtual depth of field" or "a psychological depth of field". However, the device can not provide viewers with real depth information.

Different from other stereoscopic display technologies, the volumetric display technology is really able to realize dynamic effects and gives viewers an observation of 3D perspective images "suspending" in the air, like in science fiction films. Conventionally, the volumetric 3D display technologies include a swept-volume display technology and a solid-volume display technology.

The swept-volume display technology uses structures of cylinder axis rotation plus spatial projection and includes an upright projection screen driven by a motor to rotate at a high speed and very thin semitransparent plastic. In order to display a 3D object, firstly several slices of the object are generated by software, wherein each longitudinal slice vertical to X-Y plane is extracted during a rotation of every tiny angle along Z-axis, and then, when the projection screen rotates rapidly and the plurality of slices are rapidly projected in turn, a natural 3D object is able to be perceived from all directions. The swept-volume display technology has obvious disadvantages of "luminosity" and "rotation". The display structures of all-direction openness and projection has a relatively low lumen value and tends to be affected by background lightning; the rapid rotation gives a settling platform a high requirement of stability and the settling table is forbidden to shake casually, otherwise voxels may be displayed vaguely even imaging may totally fails. Thus the swept-volume display technology is unfit for places such as spacecrafts, aircrafts and sailing vessels. Meanwhile, the imaging process is complicated and the costs are too expensive to be applied in a large scale.

As an early solid-volume display technology, solid FELIX mainly uses a whole piece of cubical crystal as a display medium. The crystal is doped with rare earth elements. When two cohered infra-red laser beams intersect at a spatial point inside the crystal, the spatial point is excited to radiate light. The solid FELIX still remains experimental in the lab. Depth Cube in considered as the highest achievement in the conventional solid-volume display technology. The Depth Cube system adopts a special method of stacking liquid crystal screens to realize 3D display and thus looks like a television set in 1980s. The display medium of the Depth Cube includes a stack of 20 liquid crystal screens, wherein each screen has a resolution of 1024×748; each screen is spaced around 5 mm. Liquid crystal pixels of these specially made screen bodies have a special electronically-controlled optical property. Under a charge of voltage, the liquid crystal body of the pixel becomes paralleling with a light beam transmission manner just like a slat of a window shades and thus the beam shot thereon perforates transparently; without any charge of voltage, the liquid crystal pixel becomes opaque and thus the beam shot thereon is diffusely reflected to form a voxel existing in the stacking body of liquid crystal screens. At any instant in time, 19 liquid crystal screens are transparent and only one is opaque and in a white diffuse reflection state; Depth Cube provides depth feelings through rapidly switching and displaying the slices of the 3D object on the 20 screens. The Depth Cube has a relatively limited viewing angle and thus is usually applied in a front face of a monitor.

The above volumetric 3D display technologies mostly use the projectors, but each pixel of a 3D image are not self-luminous. Light projected by the projector is shot onto a projection screen to light all the pixels. A quality of an image shown by the volumetric 3D display technologies is closely related with projection effects of the projection screen.

Meanwhile, all the above volumetric 3D display technologies have an inevitable disadvantage of only generating a semitransparent 3D perspective image to display an object at 360 degrees, because lights from a front of an object are unable to stop a transmission of lights from a back of the object.

Although the above three display technologies can realize real stereoscopic effects, complicated structures thereof result in expensive prices. Thus the above three display technologies are only applied in relatively advanced industries, such as laboratories, medical devices and military, rather than widely promoted into daily life.

SUMMARY OF THE PRESENT INVENTION

An object of the present invention is to overcome the above technical disadvantages and provide a new 3D stereoscopic imaging method and its system and its imaging device. The present invention realizes a 3D stereoscopic imaging by simulating a real physical depth of field generated by human eyes observing a real 3D stereoscopic image, so as to display dynamic 3D scene very vividly and have a simple structure and low costs.

The present invention provides a 3D stereoscopic imaging method whose technical solutions are following.

The 3D stereoscopic imaging method comprises following steps of:

longitudinally slicing a 3D scene according to physical depth of field for generating several 2D layers; and respectively displaying each 2D layer to form a 2D picture and splicing images of the displayed 2D pictures into an image of the original 3D scene.

The step of "respectively displaying each 2D layer to form a 2D picture and splicing images of the displayed 2D pictures into an image of the original 3D scene" comprises following steps of:

respectively displaying each 2D layer in each different 2D display window to form several 2D pictures; and polarizing light emitted from each 2D display window to transmit the light into human eyes, in such a manner that the human eyes are able to simultaneously observe the images of all the 2D pictures, and splicing the images of all the 2D pictures into an image of the original 3D scene.

The display window comprises a 2D display unit which is for transmitting light when the 2D display unit displays no picture. The light is transmitted from a display window corresponding to the 2D display unit to another display window corresponding to the 2D display unit. All light emitted from the 2D display units enters the human eyes after once reflection or more via one or more 2D display units which display no picture.

The 2D display unit is a 2D plan display unit which is for a specular reflection of light when displaying no picture. The images of the 2D picture are upright and equal-sized virtual images.

The 2D display unit comprises plan liquid crystal display modules which have a semi-transparent and semi-reflective optical element provided on a surface thereof. The semi-transparent and semi-reflective optical element, controlled by electrical signal, is for transmitting light when displaying pictures and reflecting light when displaying no picture.

The step of "longitudinally slicing a 3D scene according to a physical depth of field for generating several 2D layers" comprises following steps of:

positioning coordinates of the 3D scene in a 3D coordinate system, wherein Z-axis parallels with a direction of a physical depth of field; X-axis and Y-axis are vertical to the direction of the physical depth of field;

uniformly slicing the physical depth of field of the 3D scene along the Z-axis to slice the 3D scene into several 2D surfaces as slicing the physical depth of field;

unifying a Z-axis coordinate of each pixel point on each 2D surface and maintaining a X-axis coordinate and a Y-axis coordinate thereof unchanged; and maintaining a X-axis coordinate and a Y-axis coordinate of each pixel point on all 2D planes unchanged and filling in blank zones out of each 2D plane to produce the plurality of equal-sized 2D layers parallely arranged along the Z-axis.

The step of "splicing the images of all the 2D pictures into an image of the original 3D scene" comprises following steps of:

arranging the image of each 2D picture in an identical sequence to each 2D layer corresponding with each image;

imaging each 2D picture according to a size of each corresponding 2D plane in an identical ratio;

separating each two neighboring images of each two 2D pictures according to a distance between two 2D planes corresponding to the two 2D pictures in an identical ratio.

The present invention further provides the 3D stereoscopic imaging system whose technical solutions are following.

The 3D stereoscopic imaging system comprises:

an image source producing device, for longitudinally slicing a 3D scene into several 2D layers according to a physical depth of field;

an imaging device, for respectively displaying each 2D layer to form a 2D picture and splicing images of the displayed 2D pictures into an image of the original 3D scene.

The imaging device comprises:

a display device, for respectively displaying each 2D layer on each different 2D display window to form several 2D pictures;

a polarizing device, for polarizing light emitted from each 2D display window to transmit the light into human eyes, in such a manner that the human eyes are able to simultaneously observe the images of all the 2D pictures, and splicing the images of the displayed 2D pictures into an image of the original 3D scene.

The display window comprises a 2D display unit which is for transmitting light when displaying no picture. The light is transmitted from a display window corresponding to the 2D display unit to another display window corresponding to the 2D display unit. All light emitted from the 2D display units enters the human eyes after once reflection or more via one or more 2D display units which display no picture.

The 2D display unit is a 2D plan display unit which is for a specular reflection of light when displaying no picture. The images of the 2D picture are upright and equal-sized virtual images.

The 2D display unit comprises plan liquid crystal display modules which have a semi-transparent and semi-reflective optical element provided on a surface thereof. The semi-transparent and semi-reflective optical element, controlled by electrical signal, is for transmitting light when displaying pictures and reflecting light when displaying no picture.

The image source producing device comprises:

a coordinate positioning unit, for positioning coordinates of a 3D scene in a 3D coordinate system, wherein Z-axis parallels with a direction of a physical depth of field and X-axis and Y-axis are vertical to the direction of the physical depth of field;

a slicing unit, for uniformly slicing a physical depth of field of the 3D scene along the Z-axis to slice the 3D scene into several 2D surfaces as slicing the physical depth of field;

a 2D plane producing unit, for unifying a Z-axis coordinate of each pixel point on each 2D surface and maintaining a X-axis coordinate and a Y-axis coordinate thereof unchanged;

a 2D layer producing unit, for maintaining the X-axis coordinate and the Y-axis coordinate of each pixel point on all the 2D planes unchanged and filling in blank zones out of each 2D plane to produce several equal-sized 2D layers parallely arranged along the Z-axis.

The present invention also provides an additional imaging device whose technical solutions are following.

The additional imaging device, for respectively displaying each 2D layer arranged according to a physical depth of field of a 3D scene to form a 2D picture and splicing images of the displayed 2D pictures into an image of the original 3D scene, comprises:

a display device for respectively displaying each 2D layer on each different 2D display window to form several 2D pictures;

a polarizing device, for polarizing light emitted from the 2D display window to transmit the light into human eyes, in such a manner that the human eyes are able to simultaneously observe the images of all the 2D pictures, and splicing the images of the displayed 2D pictures into an image of the original 3D scene.

The display window comprises a 2D display unit which is for transmitting light when displaying no picture. The light is transmitted from a display window corresponding to the 2D display unit to another display window corresponding to the 2D display unit. All light emitted from the 2D display units enters the human eyes after once reflection or more via one or more 2D display units which display no picture.

The 2D display unit is a 2D plan display unit which is for a specular reflection of light when displaying no picture. The images of the 2D picture are upright and equal-sized virtual images.

The 2D display unit comprises plan liquid crystal display modules which have a semi-transparent and semi-reflective optical element provided on a surface thereof. The semi-transparent and semi-reflective optical element, controlled by electrical signal, is for transmitting light when displaying pictures and reflecting light when displaying no picture.

The present invention has following beneficial technical results.

The present invention is able to dynamically display different 3D scenes, wherein the 3D scenes are displayed colorfully and in a high definition.

Meanwhile, the present invention realizes a 3D stereoscopic imaging by simulating a real physical depth of field generated by human eyes perceiving a real 3D stereoscopic image. Users are able to see 3D scenes without wearing glasses.

The present invention has a simple structure and low costs.

An LCD (Liquid Crystal Display) rather than a projector is adopted. Thus it is not so necessary to worry about a box volume, a service life of a light bulb, heat dissipation of a light bulb and so on. The devices of the present invention are miniaturized to realize a possibility to enter daily life.

DETAILED DESCRIPTION OF THE PREFERRED EMBODIMENT

Conventional volumetric 3D display technologies work in a principle of directly transmitting light emitted from each pixel point along a straight line to enter human eyes. A static 3D scene is only an expression of a surface of a 3D space, but in order to display a dynamic 3D scene, a device able to display each pixel point of the 3D space is required, so that light emitted from a display unit of a pixel may be prevented by another display unit in front of the display unit. Conventional solutions work in a principle of vision persistence of human eyes, wherein each pixel is able to rapidly radiate light in a very short time in turn so as to from a whole 3D scene. However, many disadvantages as recited in the description of related arts still exist.

Different from the conventional principle of transmitting light along a straight line, the present invention supports an arrangement of each radiating element to be different from an arrangement of each pixel of a 3D scene. Each radiating element is freely arranged and the only requirement is to protect light emitted from a radiating pixel point from being prevented by another pixel point or an object in front of the radiating pixel point, wherein, when the pixel point radiates light, a light transmission path is changed by an optical system to satisfy a requirement that a relative location relationship of images of all pixel points observed by the human eyes is identical to a relative location relationship of the original 3D scene. Thus each pixel point is displayed through liquid crystal display modules colorfully and in a high definition, so as to avoid many disadvantages of the conventional projecting display.

Based on the above principle and idea, the present invention provides a 3D stereoscopic imaging method and its system and its imaging device. The present invention uses liquid crystal display modules which are relatively mature and have pretty good display effects as display units of pixels.

Combined with the preferred embodiments and the drawings, further detailed illustration of the present invention is following.

Figure 1:
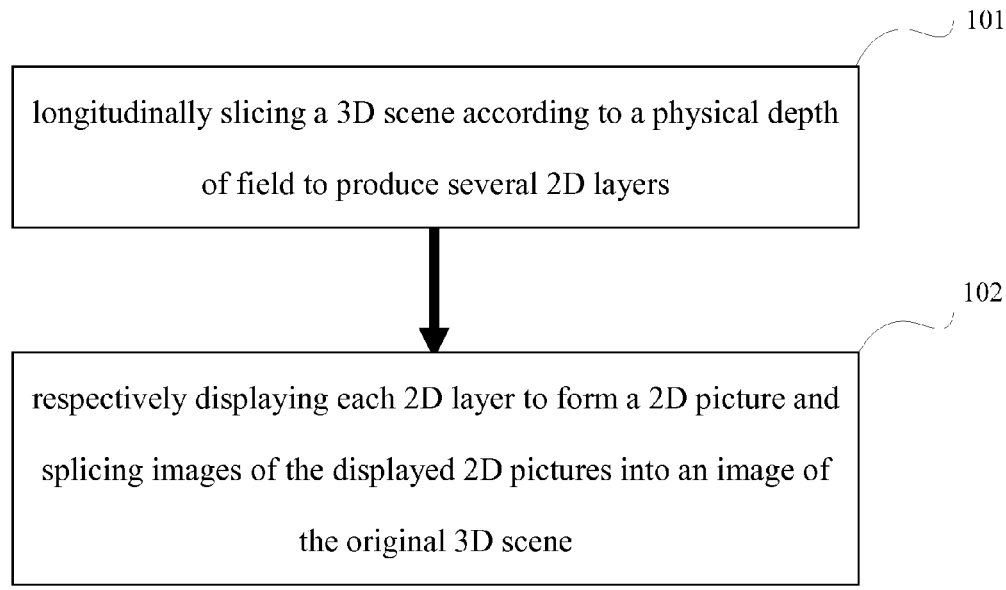
FIG. 1 is a flow chart of main steps of a 3D stereoscopic imaging method according to a preferred embodiment of the present invention.

FIG. 1 shows a 3D stereoscopic imaging method comprises following steps of:

101, longitudinally slicing a 3D scene according to a physical depth of field to produce several equal-sized and mutually paralleling 2D layers; and 102, respectively displaying each 2D layer to form a 2D picture and splicing images of the displayed images to form an image of the original 3D scene.

A 3D stereoscopic space is made of countless different 2D surfaces. A real 3D scene seen by the human eyes is actually a surface of a 3D stereoscopic space rather than a perspective view of the whole 3D stereoscopic space, because it is impossible for two points to exist in a light path of a real 3D scene and pixel points in front of the light path are able to prevent a transmission of the light.

Figure 2:
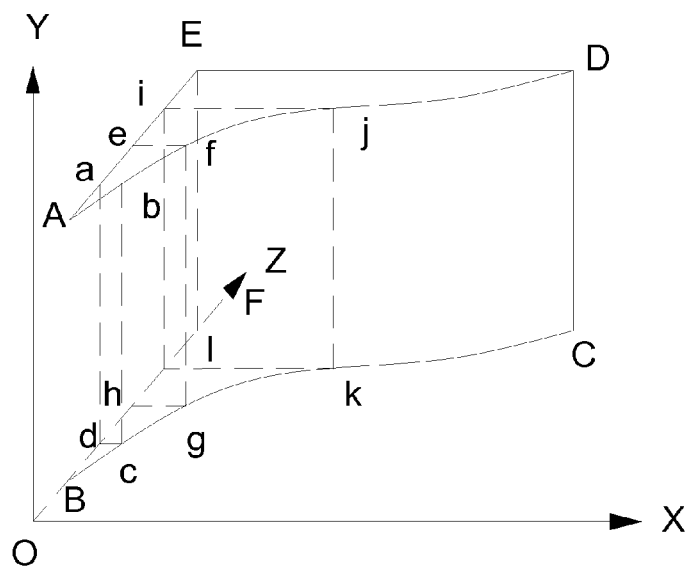
FIG. 2 is a perspective view of slicing a 3D scene of the 3D stereoscopic imaging method according to the preferred embodiment of the present invention.

Based on the above principle, as shown in FIG. 2, a 3D scene ABCDEF has its coordinates positioned in a 3D coordinate system. Each pixel point of the 3D scene has its accurate coordinate location (X, Y, Z). A solid outline shown in FIG. 2 is obtained from a direction inclining to an XOY plane. Supposing that human eyes are observing the 3D scene along Z-axis, light emitted from each pixel point of the 3D scene is transmitted along the Z-axis to reach the human eyes and thus the human eyes only catch a view of a curved surface ABCD of the 3D scene. If the curved surface ABCD is uniformly sliced along the Z-axis into countless pieces, each piece is only a line. If the curved surface ABCD is uniformly sliced along the Z-axis into limited pieces, such as four pieces, line bc, line fg and line jk are boundaries of the curved surface ABCD and each piece is actually a part of the curved surface ABCD and also a section of a surface of a 3D stereoscopic space. If each sliced 2D curved surface is respectively displayed on each different 2D display unit, splicing 2D pictures displayed by the limited 2D display units forms an integral 3D scene.

When displaying a dynamic 3D scene, a size and a shape of each 2D display unit are free from being restricted by the sliced 2D surfaces, which means that each 2D display unit is able to display pixel points of any location of the 3D scene. An ideal result may be that all 2D display units are 2D curved surfaces or 2D planes having identical and regular shapes and identical sizes.

A shape of the 2D surface produced by slicing the 3D scene is different from the shape of the 2D display unit, so it is necessary to modify the shape of the 2D surface after slicing to be similar with the shape of the 2D display unit, which is realized by modifying the 2D surface into a projection of the 2D surface onto the 2D display unit.

Figure 3:
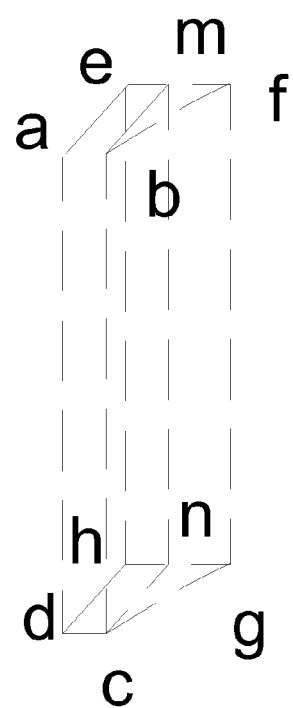
FIG. 3 is a perspective view of a method of modifying a 2D surface into a 3D plane of the 3D stereoscopic imaging method according to the preferred embodiment of the present invention.

According to a preferred embodiment of the present invention, 2D plane display units are adopted as the 2D display units; the 3D scene are uniformly sliced into four pieces; there are four 2D plane display units. A 2D surface on different planes is modified into a 2D plane, in such a manner that each 2D plane display unit is able to display the 2D surface on different planes. FIG. 3 shows the modification in details. In FIG. 2, on a sliced 2D surface, pixels points b, c, f and g respectively have coordinates of $(x_b, y_b, z_b)$, $(x_c, y_c, z_c)$, $(x_f, y_f, z_f)$ and $(x_g, y_g, z_g)$. The coordinates of each pixel point are unified along Z-axis, which means that $z_b$, $z_c$, $z_f$ and $z_g$ are unified on a given number, so that pixel points b, c, f and g are all on a 2D plane. Coordinates of other pixel points on the 2D plane are also unified along the Z-axis on the given number, which means that all pixel points on the 2D surface are on a 2D plane. A 2D plane mnfg is produced after modifying.

Figure 4:
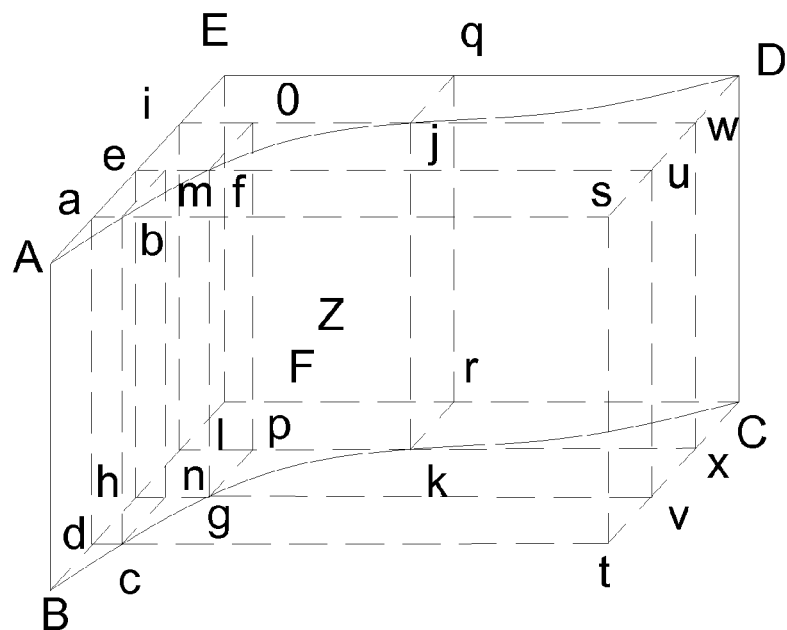
FIG. 4 is a perspective view of relative locations of each 2D plane of the 3D stereoscopic imaging method according to the preferred embodiment of the present invention.

As shown in FIG. 4, by the above method, the 3D scene is sliced into four 2D planes at different locations of a XOY plane including abcd, mfgn, ojkp and qDCr; black zones out of each 2D plane are filled in and produced into four equal-sized 2D layers longitudinally and parallely arranged, including astd, euvh, iwxl and EDCF. Thus a location of each 2D plane on each 2D layer is determined, which means that coordinates on X-axis and Y-axis of the pixel points on the 2D layers are kept unchanged.

Figure 5:
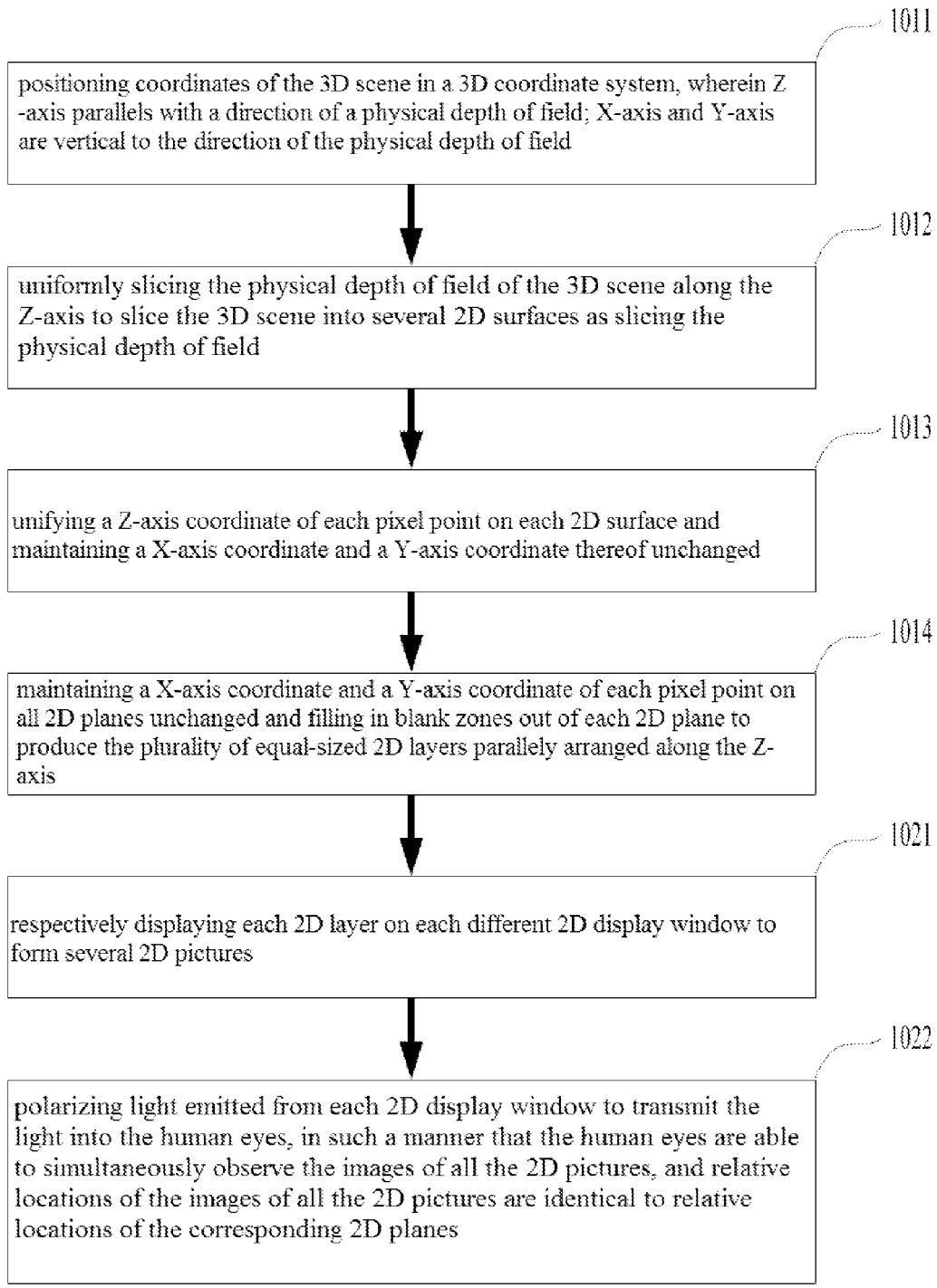
FIG. 5 is a flow chart of detailed steps of the 3D stereoscopic imaging method according to the preferred embodiment of the present invention.

Thus, FIG. 5 shows the step 101 of "longitudinally slicing a 3D scene according to a physical depth of field to produce several equal-sized and mutually paralleling 2D layers", shown in FIG. 4, comprises following steps of:

1011, positioning coordinates of the 3D scene on a 3D coordinate system, wherein the Z-axis parallels with a direction of a physical depth of field; the X-axis and the Y-axis are vertical to the direction of the physical depth of field;

1012, uniformly slicing the physical depth of field of the 3D scene along the Z-axis to slice the 3D scene into several sections of 2D surfaces as slicing the physical depth of field;

1013, unifying a coordinate on the Z-axis of each pixel point on each 2D surface and maintaining a coordinate on the X-axis and on the Y-axis unchanged, in such a manner that a set of newly produced pixel points is a projection of each 2D surface onto a plane vertical to the Z-axis, i.e., pixel points of each 2D surface on different planes are compressed onto a 2D plane with identical longitudinal coordinates, wherein in order to ensure that the pixel points on neighboring 2D planes have the longitudinal coordinates uniformly spaced, the longitudinal coordinates of the pixel points on each 2D surface are required to be identical, for example, all the pixel points on each 2D surface have identical longitudinal coordinates to the nearest pixel point to the human eyes, to the farthest pixel point to the human eyes or to a pixel point at a median distance to the human eyes; and

1014, maintaining the X-axis coordinate and the Y-axis coordinate of each pixel point on all 2D planes unchanged and filling in the blank zones out of each 2D plane to produce several equal-sized 2D layers parallely arranged along the Z-axis.

The step 102 of "respectively displaying each 2D layer to form a 2D picture and splicing images of the displayed images to form an image of the original 3D scene" comprises following steps of:

1021, respectively displaying each 2D layer in each different 2D display window to form several 2D pictures; and

1022, polarizing light emitted from each 2D display window to transmit the light into the human eyes, in such a manner that the human eyes are able to simultaneously observe the images of all the 2D pictures and relative locations of the images of all the 2D pictures are identical to relative locations of the corresponding 2D planes.

The identical relative locations are realized by arranging the image of each 2D picture in an identical sequence to each 2D layer corresponding with each image; imaging each 2D picture according to a size of each corresponding 2D plane in an identical ratio; and separating each two neighboring images of each two 2D pictures according to a distance between two 2D planes corresponding to the two 2D pictures in an identical ratio.

The display window comprises a 2D display unit. The 2D layers are shown on a front surface of the 2D display unit. Light is emitted only from the front surface of the 2D display unit rather than from a back surface thereof. The back surface thereof allows no light transmission. Thus the arrangement sequence of the 2D display units is changed from the arrangement sequence showed in FIG. 4. Light emitted from the 2D display units are required not to be prevented by other 2D display units, so even if all the 2D display units display the 2D layers simultaneously, the human eyes are able to see several 2D pictures simultaneously. This display method simulates a real object to radiate light rather than works under the principle of visual persistence, so as to relief visual burdens of the human eyes.

FIG. 4 shows the longitudinally arranged 2D layers, but the 2D display windows are required to be arranged transversally to protect the emitted light from being prevented by the 2D display windows in front of the light path. Different transversal arrangements of the 2D display windows result in different degrees of polarization of the light emitted from each 2D display window, only within the requirement that the human eyes are able to observe the images of all 2D pictures through an imaging window.

Figure 6:
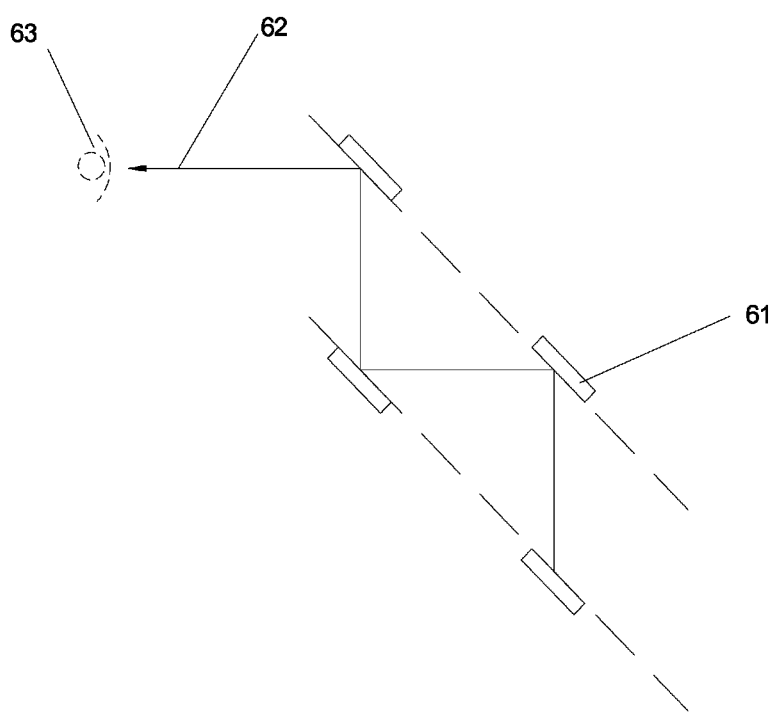
FIG. 6 is a sketch view of an arrangement of 2D plan display windows of the 3D stereoscopic imaging method according to the preferred embodiment of the present invention.

According to the preferred embodiment of the present invention, the 2D display window comprises four 2D plane display window arranged as FIG. 6. The 2D display window 61 are divided in two groups, wherein each group of display windows is on only a plane and two planes of the two groups are mutually parallel. Two neighboring display windows from two different groups are mutually parallel and opposed inclinedly at an identical angle. The identical inclining angle means that the inclining angles from two centers of the two plane display units are identical. Each two centers of two neighboring display units from an identical group are separated in an identical distance.

The 2D plane display window 61 further comprises a 2D plane reflecting unit for reflecting light. The 2D plane reflecting units are spread around the 2D plane display unit and on an identical plane with all the 2D plane display units. A first 2D plane reflecting unit is for reflecting light 62 emitted from a first 2D plane display unit opposite to the first 2D plane reflecting unit onto a second 2D plane reflecting unit in a second 2D plane display window opposite to the first 2D plane reflecting unit, or transmitting light reflected by a third 2D plane reflecting unit opposite to the first 2D plane reflecting unit onto a fourth 2D plane reflecting unit in a fourth 2D plane display window opposite to the first 2D plane reflecting unit. The light emitted from the 2D plane display units enters the human eyes 63 after once reflection or more.

When displaying a dynamic 3D scene, a location of a 2D picture displayed on each 2D plane display unit differs at any moment. If locations of the 2D plane reflecting units are fixed, reflected light fails to reach the human eyes. Thus the 2D plane reflecting units are required to move with the 2D pictures.

When the display window comprises 2D display units which are for transmitting light when displaying no picture, the light is transmitted from a first display window corresponding to the 2D display unit to a second display window corresponding to the 2D display unit; all light emitted from the 2D display units enters the human eyes after once reflection or more via one or more 2D display units which display no picture.

Figure 7:
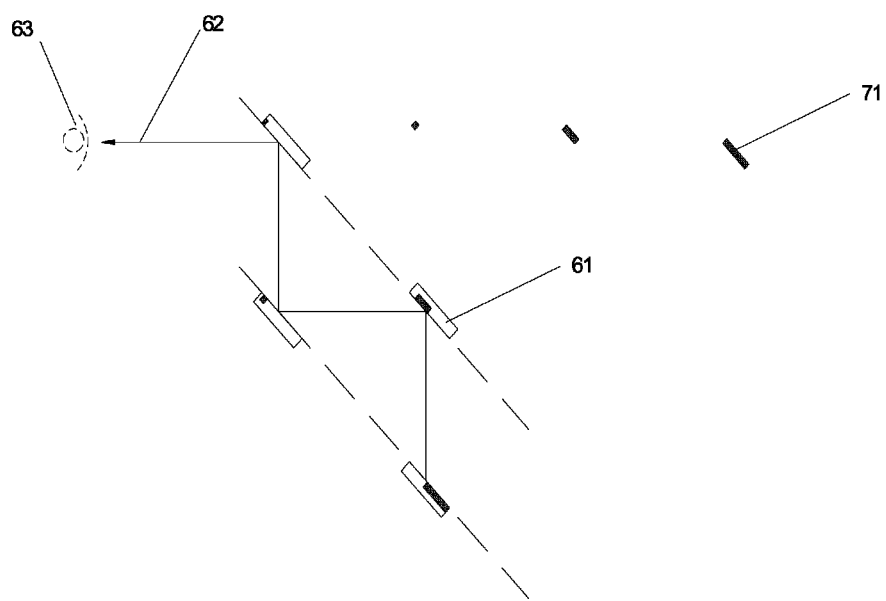
FIG. 7 is a sketch view of an imaging of each 2D plane of the 3D stereoscopic imaging method according to the preferred embodiment of the present invention.

An advantage of the present invention is following. The pixel points on each 2D layer have different coordinates on the X-axis and the Y-axis with the pixel points on other 2D layers. In other words, when a 2D layer is displayed in a 2D display unit, zones having identical coordinates on the X-axis and the Y-axis on other 2D layers are not showed. As FIG. 4 shows, the unshowed zones exactly work as the 2D plane reflecting units for reflecting a 2D picture displayed in another 2D display unit corresponding to the 2D plane reflecting unit; light emitted from the 2D display units are shot out from an end of the two groups of the 2D display windows after successive multi-reflections, i.e., the 2D pictures displayed on the 2D display units are imaged successively on several 2D reflecting units and finally the human eyes are able to perceive the image from one of those 2D display windows. FIG. 7 shows the upright and equal-sized virtual image 71. The 2D display window works as an imaging window and also is able to display 2D pictures, i.e., the 2D pictures are real objects rather than images. Thus a virtual image and a real object are both accessible from the imaging window. One skilled in the art will easily understand that, if there is a reflecting mirror diagonally opposite to the imaging window and the reflecting mirror is on an imaging light path of each 2D picture, viewers are also able to see the images of all the 2D picture through the reflecting mirror. Thus a structure like this is included in the present invention and also within the spirit and scope of the following claims.

In FIG. 7, each 2D display window 61 is equal-sized and each 2D display unit is also equal-sized. Each 2D layer is produced to be equal-sized. Thus each 2D picture displayed on each 2D display unit has an identical size to each 2D plane produced by slicing the original 3D scene. Further an image of each 2D picture has an identical size to each 2D plane produced by slicing the original 3D scene. If the two groups of 2D display windows 61 are spatially separated, the image of each 2D picture is also spatially separated with each other. When the human eyes are observing an object, an image of the object when far away from the human eyes is smaller than an image of the object when close to the human eyes. During the production of the 2D layers, a size of each object of the original scene has already been enlarged or reduced according to an actual size seen by the human eyes. If the size of the image of each 2D plane perceived by the human eyes from the imaging window is further changed, a distortion of the 3D scene may exist.

Figure 8:
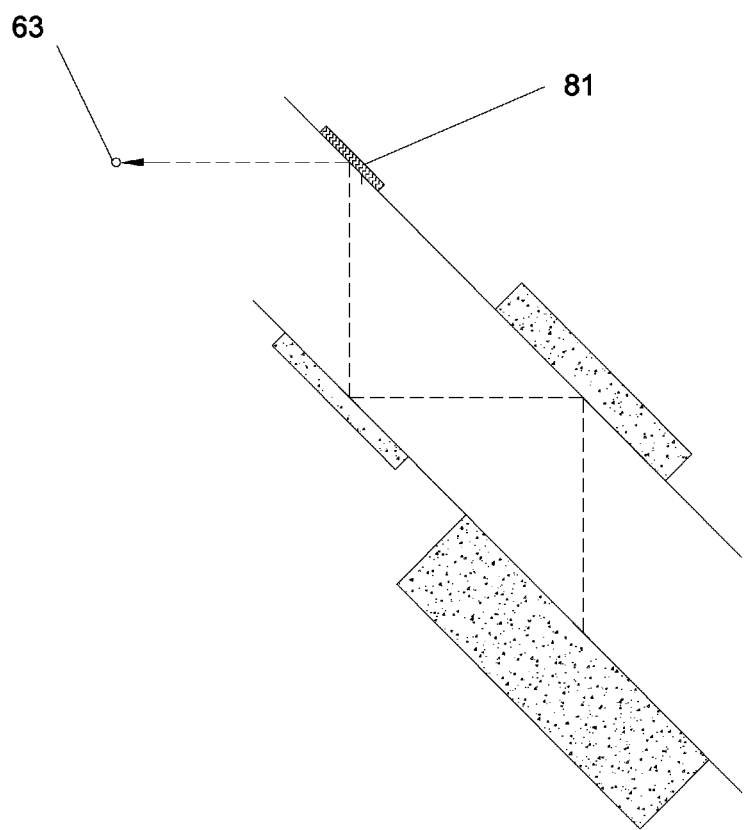
FIG. 8 is a sketch view of a size and an arrangement of each 2D plan display unit according to the preferred embodiment of the present invention.

Thus it is necessary to reset the size of each 2D display window. FIG. 8 shows that an area of each 2D display window is simultaneously enlarged in turn according to a distance between the 2D display window and the imaging window 81. Each 2D display window is respectively 4 times, 9 times and 16 times larger than the imaging window 81.

According to the preferred embodiment of the present invention, a near view and a far view of the 3D scene have an identical visual field. In a real observing process of an object of a 3D scene, the visual field becomes very narrow when the object is near even only a part of the object may be seen, whereas the visual field becomes very wide when the object is far away even the whole object may be seen. Thus the 3D scene actually perceived by the human eyes is a surface of a cone-shaped body rather than a surface of a cuboid. By slicing the 3D scene into several 2D planes, each 2D plane has a different area. For example, when the 3D scene is sliced into four pieces, the three far 2D planes are respectively 4 times, 9 times and 16 times larger than the nearest 2D plane.

Figure 9:
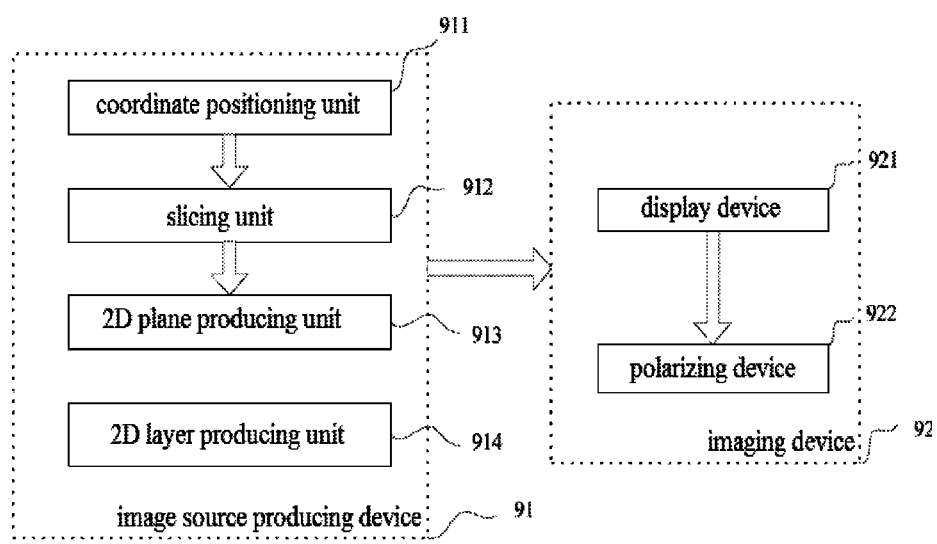
FIG. 9 is a block diagram of a 3D stereoscopic imaging system according to the preferred embodiment of the present invention.

By the above method, the present invention also provides a 3D imaging system, as shown in FIG. 9, comprising:

an image source producing device 91, for longitudinally slicing the 3D scene according to a physical depth of field to produce several parallel and equal-sized 2D layers, wherein the imaging source producing devices 91 comprises:

a coordinate positioning unit 911, for positioning coordinates of the 3D scene in a 3D coordinate system, wherein Z-axis parallels with a direction of the physical depth of field and X-axis and Y-axis are vertical to the direction of the physical depth of field;

a slicing unit 912, for uniformly slicing the physical depth of field of the 3D scene along the Z-axis to slice the 3D scene into several 2D surfaces as slicing the physical depth of field;

a 2D plane producing unit 913, for unifying a Z-axis coordinate of each pixel point on each 2D surface and maintaining a X-axis coordinate and a Y-axis coordinate thereof unchanged, wherein in order to ensure that pixel points on each two neighboring 2D planes have longitudinal coordinates uniformly spaced, the longitudinal coordinates of the pixel points on each 2D surface are required to be set in an identical manner, for example, all the pixel points on each 2D surface have identical longitudinal coordinates to the nearest pixel point to the human eyes, to the farthest pixel point to the human eyes or to a pixel point at a median distance to the human eyes; and a 2D layer producing unit 914, for maintaining the X-axis coordinate and the Y-axis coordinate of each pixel point on all the 2D planes unchanged and filling in blank zones out of each 2D plane to produce several equal-sized 2D layers parallelly arranged along the Z-axis; and an imaging device 92, for respectively displaying each 2D layer to form a 2D picture and splicing images of the displayed 2D pictures into an image of the original 3D scene, wherein the imaging device comprises:

a display device 921, for respectively displaying each 2D layer on each different 2D display window to form several 2D pictures;

a polarizing device 922, for polarizing light emitted from the 2D display windows to transmit the light into human eyes, in such a manner that the human eyes are able to simultaneously observe the images of all the 2D pictures and relative locations of the images of all the 2D pictures are identical to relative locations of the corresponding 2D planes.

As shown in FIG. 8, the display device 921 comprises four 2D plane display units which are divided into two groups, wherein each group of display windows is on only a plane and two planes of the two groups are mutually parallel. Two neighboring display windows from two different groups are mutually parallel and opposed inclinedly at an identical angle. The identical inclining angle means that the inclining angles from two centers of the two plane display units are identical. Each two centers of two neighboring display units from an identical group are separated in an identical distance.

In order to reduce a size distortion of the images in the human eyes caused by the distance between the two groups of plane display units, the size of each 2D plane display unit is different. The nearest 2D plane display unit to the human eyes is the imaging window. Each 2D plane display unit is respectively 16 times, 9 times and 4 times larger than the imaging window from being far away from the imaging window to be close to the imaging window.

A different arrangement of the 2D plane display units result in a different degree of polarization of each 2D plane display unit generated by the polarizing device 922, in order to restore the images of the 2D pictures displayed on the 2D plane display units. The relative locations of all the images are identical to the relative locations of the 2D planes. Actually, if the arrangement of the 2D plane display units is less than ideal, the polarizing device 922 becomes very complicated, even however the polarization device is adjusted the relative locations of all the images are still different from the relative locations of the 2D planes. The present invention has following advantages.

Each two 2D plane display units are opposite to each other. Moreover, the 2D plane display unit reflects light when displaying no 2D picture, when the 2D plane display unit is actually a 2D plane reflecting unit. When a 2D plane reflecting unit corresponding to the 2D plane display unit reflects light emitted from the 2D plane display unit onto another corresponding 2D plane reflecting unit, and the light emitted from the 2D plane display unit is successively reflected by a series of the 2D plane reflecting units and finally shot out from an end of the two groups of 2D plane reflecting units to enter the human eyes, the 2D picture displayed on the 2D plane display unit exactly images on the final 2D plane reflecting unit. The structure of the present invention exactly satisfies this requirement, as illustrated above without repeating herein.

The 2D reflecting unit of the present invention actually works as a polarizer to polarizing the light emitted from the 2D display window to transmit the light into the human eyes, and thus the display device 921 becomes the polarizing device 922 when displaying no 2D picture.

The 2D display unit comprises plane liquid crystal display modules which have a semi-transparent and semi-reflective optical element provided on a surface. The semi-transparent and semi-reflective optical element, controlled by electrical signal, is for transmitting light when displaying pictures and reflecting light when displaying no picture.

The image source producing device 91 and the imaging device 92 of the present invention are able to work independently. Actually other volumetric 3D display devices are able to display the 2D layers produced by the image source producing device 91, such as Depth Cube recited in the description of related arts. And the imaging device 92 of the present invention is also able to display 2D layers produced by the other volumetric 3D display technologies. Thus the imaging device 92 of the present invention can be claimed independently.

What is claimed is:

1. A 3D stereoscopic imaging method comprising following steps of:
   longitudinally slicing a 3D scene according to a physical depth of field to produce several 2D layers; and
   respectively displaying each 2D layer to form a 2D picture and splicing images of the displayed 2D pictures into an image of the original 3D scene;
   wherein said step of respectively displaying each 2D layer to form a 2D picture and splicing images of the displayed 2D pictures into an image of the original 3D scene comprises following steps of:
   respectively displaying each 2D layer on each different 2D display window to form several 2D pictures; and
   polarizing light emitted from the 2D display windows into human eyes, in such a manner that the human eyes are able to perceive the images of all the pictures, and splicing the images of all the 2D pictures into the image of the original 3D scene;
   wherein the display window comprises a 2D display unit which is for transmitting light via reflection when displaying no picture; the light is transmitted from a first display window corresponding to a first 2D display unit to a second display window corresponding to a second 2D display unit; all light emitted from the 2D display units enters the human eyes after once reflection or more via one or more 2D display units which display no picture; each two 2D display units are opposite to each other; the 2D layers are shown on a front surface of the 2D display unit, and light is emitted only from the front surface of the 2D display unit rather than from a back surface thereof; the 2D display windows are arranged transversally to protect the emitted light from being prevented by the 2D display windows, in such a manner that even if all the 2D display units display the 2D layers simultaneously, the human eyes are able to see the 2D pictures simultaneously; and, different transversal arrangements of the 2D display windows result in different degrees of polarization of the light emitted from each 2D display window.

2. The 3D stereoscopic imaging method, as recited in claim 1, wherein the 2D display unit is a 2D plane display unit which is for specularly reflecting light when displaying no picture; the image of the 2D picture is an upright and equal-sized virtual image.

3. The 3D stereoscopic imaging method, as recited in claim 2, wherein the 2D display unit comprises plane liquid crystal display modules which have a semi-transparent and semi-reflective optical element provided on a surface; the semi-transparent and semi-reflective optical element, controlled by electrical signal, is for light penetrating when displaying the pictures and reflecting light when displaying no picture.

4. The 3D stereoscopic imaging method, as recited in claim 3, wherein said step of longitudinally slicing a 3D scene according to a physical depth of field to produce several 2D layers comprises following steps of:
   positioning coordinates of the 3D scene on a 3D coordinate system, wherein Z-axis parallels with a direction of the physical depth of field and X-axis and Y-axis are vertical to the direction of the physical depth of field;
   uniformly slicing the physical depth of field of the 3D scene along the Z-axis to slice the 3D scene into several 2D surfaces as slicing the physical depth of field;
   unifying a coordinate on the Z-axis of each pixel point on each 2D surface and maintaining coordinates on the X-axis and on the Y-axis thereof unchanged; and
   maintaining coordinates on the X-axis and on the Y-axis of each pixel point on all 2D planes unchanged and filling in blank zones of each 2D plane to produce the equal-sized 2D layers parallely arranged along the Z-axis.

5. The 3D stereoscopic imaging method, as recited in claim 4, wherein said step of splicing the images of all the 2D pictures into the image of the original 3D scene comprises following steps of:
   arranging the image of each 2D picture in an identical sequence to each 2D layer corresponding with each image;
   imaging each 2D picture according to a size of each corresponding 2D plane in an identical ratio;
   separating each two neighboring images of each two 2D pictures according to a distance between two 2D planes corresponding to the two 2D pictures in an identical ratio.

6. The 3D stereoscopic imaging method, as recited in claim 5, wherein the pixel points on one of the 2D layers have different coordinates on the X-axis and the Y-axis with the pixel points on the other of the 2D layers; when one of the 2D layers is displayed in a 2D display unit, zones having identical coordinates on the X-axis and the Y-axis on other 2D layers are not shown.

7. A 3D stereoscopic imaging system comprising:
   an image source producing device, for longitudinally slicing a 3D scene according to a physical depth of field to produce several 2D layers;
   an imaging device, for respectively displaying each 2D layer to form a 2D picture and splicing images of the displayed 2D pictures into an image of the original 3D scene;
   wherein said imaging device comprises:
   a display device, for respectively displaying each 2D layer on each different 2D display window to form several 2D pictures;
   a polarizing device, for polarizing light emitted from each 2D display window into human eyes, in such a manner that the human eyes are able to simultaneously observe images of all the 2D pictures, and splicing the images of the displayed 2D pictures into an image of the original 3D scene;

wherein said 2D display window comprises a 2D display unit which is for transmitting light via reflection when displaying no picture; the light is transmitted from a first display window corresponding to a first 2D display unit to a second display window corresponding to a second 2D display unit; the light emitted from all said 2D display units enters human eyes after once reflection or more via one or more said 2D display units which display no picture; each two 2D display units are opposite to each other; the 2D layers are shown on a front surface of said 2D display unit, and the light is emitted only from said front surface of said 2D display unit rather than from a back surface thereof; said 2D display windows are arranged transversally to protect the emitted light from being prevented by said 2D display windows, in such a manner that even if all said 2D display units display the 2D layers simultaneously, the human eyes are able to see the 2D pictures simultaneously; and, different transversal arrangements of said 2D display windows result in different degrees of polarization of the light emitted from each 2D display window.

8. The 3D stereoscopic imaging system, as recited in claim 7, wherein said 2D display unit is a 2D plane display unit which is for specularly reflecting light when displaying no picture; the image of the 2D picture is an upright and equal-sized virtual image.

9. The 3D stereoscopic imaging system, as recited in claim 8, wherein said 2D display units comprises plane liquid crystal display modules which have a semi-transparent and semi-reflective optical element provided on a surface; said semi-transparent and semi-reflective optical element, controlled by electrical signal, is for light penetrating when displaying the pictures and reflecting light when displaying no picture.

10. The 3D stereoscopic imaging system, as recited in claim 9, wherein said image source producing device comprises:
- a coordinate positioning unit, for positioning coordinates of the 3D scene in a 3D coordinate system, wherein Z-axis parallels with a direction of the physical depth of field and X-axis and Y-axis are vertical to the direction of the physical depth of field;
- a slicing unit, for uniformly slicing the physical depth of field of the 3D scene along the Z-axis to slice the 3D scene into several 2D surfaces as slicing the physical depth of field;
- a 2D plane producing unit, for unifying Z-axis coordinate of each pixel point on each 2D surface and maintaining X-axis coordinate and Y-axis coordinate thereof unchanged;
- a 2D layer producing unit, for maintaining the X-axis coordinate and the Y-axis coordinate of each pixel point on all the 2D planes unchanged and filling in blank zones out of each 2D plane to produce several equal-sized 2D layers parallely arranged along the Z-axis.

11. The 3D stereoscopic imaging system, as recited in claim 10, wherein the pixel points on one of the 2D layers have different coordinates on the X-axis and the Y-axis with the pixel points on the other of the 2D layers; when one of the 2D layers is displayed in a 2D display unit, zones having identical coordinates on the X-axis and the Y-axis on other 2D layers are not shown.

12. A 3D stereoscopic imaging device, for respectively displaying each 2D layer arranged according to a physical depth of field of a 3D scene to form a 2D picture and splicing images of the displayed 2D pictures into an image of the original 3D scene, comprising:
- a display device, for respectively displaying each 2D layer on each different 2D display window to form several 2D pictures;
- a polarizing device, for polarizing light emitted from the 2D display window into human eyes, in such a manner that the human eyes are able to simultaneously observe the images of all the 2D pictures, and splicing the images of the displayed 2D pictures into an image of the original 3D scene;

wherein said display window comprises a 2D display unit which is for transmitting light via reflection when displaying no picture; the light is transmitted from a first display window corresponding to a first 2D display unit to a second display window corresponding to a second display unit; the light emitted from all said 2D display units enters human eyes after once reflection or more via one or more said 2D display units which display no picture; each two 2D display units are opposite to each other; the 2D layers are shown on a front surface of said 2D display unit, and the light is emitted only from said front surface of said 2D display unit rather than from a back surface thereof; said 2D display windows are arranged transversally to protect the emitted light from being prevented by said 2D display windows, in such a manner that even if all said 2D display units display the 2D layers simultaneously, the human eyes are able to see the 2D pictures simultaneously; and, different transversal arrangements of said 2D display windows result in different degrees of polarization of the light emitted from each 2D display window.

13. The imaging device, as recited in claim 12, wherein said 2D display unit is a 2D plane display unit which is for specularly reflecting light when displaying no picture; the image of the 2D picture is an upright and equal-sized virtual image.

14. The imaging device, as recited in claim 13, wherein said 2D display unit comprises plane crystal liquid display modules which have a semi-transparent and semi-reflective optical element provided on a surface; said semi-transparent and semi-reflective optical element, controlled by electrical signal, is for light penetrating when displaying the pictures and reflecting light when displaying no picture.

* * * * *